US011907263B1

(12) United States Patent
Budalakoti

(10) Patent No.: US 11,907,263 B1
(45) Date of Patent: Feb. 20, 2024

(54) AUTOMATED INTERLEAVED CLUSTERING RECOMMENDATION FOR DATABASE ZONE MAPS

(71) Applicant: Oracle International Corporation, Redwood Shores, CA (US)

(72) Inventor: Suratna Budalakoti, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/963,756

(22) Filed: Oct. 11, 2022

(51) Int. Cl.
*G06F 7/00* (2006.01)
*G06F 16/27* (2019.01)
*G06F 7/08* (2006.01)
*G06F 16/2455* (2019.01)
*G06F 16/28* (2019.01)

(52) U.S. Cl.
CPC .............. *G06F 16/278* (2019.01); *G06F 7/08* (2013.01); *G06F 16/24554* (2019.01); *G06F 16/285* (2019.01)

(58) Field of Classification Search
CPC ................. G06F 16/278; G06F 16/285; G06F 16/24554; G06F 7/08
USPC ................................ 707/718, 737, 756, 754
See application file for complete search history.

(56) References Cited

U.S. PATENT DOCUMENTS

| | | | |
|---|---|---|---|
| 5,899,986 A | 5/1999 | Ziauddin | |
| 6,223,171 B1 | 4/2001 | Chaudhuri | |
| 2004/0225639 A1 * | 11/2004 | Jakobsson | G06F 16/24542 |
| 2006/0161517 A1 | 7/2006 | Bhattacharjee et al. | |
| 2009/0006380 A1 | 1/2009 | Agrawal et al. | |
| 2014/0095502 A1 * | 4/2014 | Ziauddin | G06F 16/285 |
| | | | 707/E17.046 |

(Continued)

FOREIGN PATENT DOCUMENTS

| | | |
|---|---|---|
| WO | WO 2020/018718 | 1/2020 |
| WO | WO 2022/147237 A1 | 7/2022 |

OTHER PUBLICATIONS

Wikipedia.com, "Z-Order Curve", https://en.wikipedia.org/wiki/Z-order_curve, last updated Sep. 2022, 8 pages.

(Continued)

*Primary Examiner* — Md I Uddin
(74) *Attorney, Agent, or Firm* — Hickman Becker Bingham Ledesma LLP; Brian N. Miller

(57) ABSTRACT

A computer measures for each column in many rows, a respective frequency of statements that filter the column in a workload of database statements, a respective count of distinct values used for filtration on the column in each statement individually, a respective frequency of each of the counts of distinct values used for filtration on the column across all of the database statements, and a respective value range of the column for each of many storage zones. A respective efficiency is measured for each of many distinct interleaved sorts. Each interleaved sort uses a respective distinct subset of the columns. Each interleaved sort is based on portions of each of the values for each row in a sampled subset of rows in each column of the subset of the columns of the interleaved sort. Efficiency measurement is based on frequencies of statements, value ranges of columns for each storage zone, and frequencies of counts of distinct values.

18 Claims, 5 Drawing Sheets

(56) References Cited

U.S. PATENT DOCUMENTS

| | | |
|---|---|---|
| 2014/0095520 A1* | 4/2014 | Ziauddin ............ G06F 16/24557 707/E17.014 |
| 2018/0068008 A1 | 3/2018 | Cruanes et al. |
| 2019/0102427 A1 | 4/2019 | Chakkappen et al. |
| 2019/0236474 A1 | 8/2019 | Smith et al. |
| 2021/0382897 A1 | 12/2021 | Potharaju et al. |
| 2022/0207032 A1 | 6/2022 | Budalakoti |

OTHER PUBLICATIONS

Wikipedia.com, "Space-Filling Curve", https://en.wikipedia.org/wiki/Space-filling_curve, last updated Aug. 2022, 6 pages.

Su et al. "Approximate Aggregates in Oracle 12C", CIKM'16, dated Oct. 24-28, 2016, Indianapolis, IN, USA, ACM, 10 pages.

Snowflake.com, "Micro-Partitions & Data Clustering", Snowflake Documentation, https://docs.snowflake.com/en/user-guide/tables-clustering-micropartitions.html#clustering-information-maintained-for-micro-partitions, retrieved Oct. 2022, 7 pages.

Snowflake.com, "Clustering Keys & Clustered Tables", Snowflake Documentation, https://docs.snowflake.com/en/user-guide/tables-clustering-keys.html#strategies-for-selecting-clustering-keys, retrieved Oct. 2022, 15 pages.

Snowflake.com, "Automatic Clustering", Snowflake Documentation, https://docs.snowflake.com/en/user-guide/tables-auto-reclustering.html, retrieved Oct. 2022, 7 pages.

Oracle.com, "Using Zone Maps", Data Warehousing Guide, 12c Release, Chapter 13, https://docs.oracle.com/database/121/DWHSG/zone_maps.htm#DWHSG9357, dated 2017, 26 pages.

Oracle.com, "Attribute Clustering", Data Warehousing Guide, 12c Release, Chapter 12, https://docs.oracle.com/en/database/oracle/oracle-database/19/dwhsg/attribute-clustering.html#GUID-7B007A3C-53C2-4437-9E71-9ECECF8B4FAB, dated 2017, 12 pages.

Idreos et al., "Database Cracking", 3rd Biennial Conference on Innovative Data Systems Research, dated Jan. 2007, 11 pages.

IBM.com, "Zone Maps", IBM Documentation, PureData System for Analytics, 7.2.1, https://www.ibm.com/docs/en/psfa/7.2.1?topic=statistics-zone-maps, last updated Apr. 2022, 1 page.

Edjah, Nenya, "Zone Map Layout Optimization", Bachelor's thesis, Harvard College, https://dash.harvard.edu/bitstream/han dle/1/37364697/EDJAH-SENIORTHESIS-2020.pdf, dated May 2020, 55 pages.

Claes, Jef, "Amazon Redshift—Fundamentals", https://s3-eu-west-1.amazonaws.com/cdn.jefclaes.be/amazon-redshift-fundamentals/aws-redshift-fundamentals.html, retrieved Oct. 2022, 28 pages.

Bayliss, Nigel, "Optimizing Table Scans with Zone Maps", The Autonomous Database Insider, https://blogs.oracle.com/datawarehousing/post/optimizing-table-scans-with-zone-maps, dated Nov. 2014, 10 pages.

Ahmed et al., "Automated Generation of Materialized Views in Oracle", Proceedings of the VLDB Endowment, vol. 13, No. 12, dated Aug. 2020, 13 pages.

Ziauddin et al., "Dimensions Based Data Clustering and Zone Maps", Proceedings of the VLDB Endowment, vol. 10, No. 12, dated Aug. 2017, 12 pages.

"Amazon Redshift Database Developer Guide", https://web.archive.org/web/20180608125513if_/https://docs.aws.amazon.com/redshift/latest/dg/redshift-dg.pdf, retrieved Apr. 10, 2023, see section "Choosing Sort Keys", Jun. 8, 2018, 400pgs.

* cited by examiner

FIG. 1

TABLE 110

| | | COLUMN A | COLUMN B | COLUMN C | COLUMN D |
|---|---|---|---|---|---|
| ZONE X | ROW R1 | 'Chicago' | 'IL' | 2 | 'green' |
| | ROW R2 | 'Denver' | 'CO' | null | 'yellow' |
| | ROW R3 | 'Boston' | 'MA' | 10 | 'green' |
| ZONE Y | ROW R4 | 'Paris' | '' | 1 | 'green' |

COMPUTER 100

WORKLOAD 120

| | COLUMN A | COLUMN B | COLUMN C | WEIGHT 130 |
|---|---|---|---|---|
| STATEMENT S1 | 1.0 | 1.0 | 0.5 | |
| STATEMENT S2 | 3 | 0 | 0 | COUNT 140 |
| | 2 | 1 | 1 | |
| | 0=0.0 | 0=0.5 | 0=0.5 | HETEROGENEITY 150 |
| | 1=0.0 | 1=0.5 | 1=0.5 | |
| | 2=0.5 | 2=0.0 | 2=0.0 | |
| | 3=0.5 | 3=0.0 | 3=0.0 | |

ZONE MAP 160

| | ZONE X | | ZONE Y | |
|---|---|---|---|---|
| | MINIMUM | MAXIMUM | MINIMUM | MAXIMUM |
| COLUMN A | 'Boston' | 'Denver' | 'Paris' | 'Paris' |
| COLUMN B | 'CO' | 'MA' | '' | '' |
| COLUMN C | null | 10 | 1 | 1 |
| COLUMN D | 'Green' | 'Yellow' | 'Green' | 'Green' |

| ITERATION | QUEUE 170 |
|---|---|
| 0 | A<br>B<br>C |
| 1 | B<br>C<br>A,B<br>A,C |
| 2 | C<br>A,B<br>A,C<br>B,C |
| 3 | A,B<br>A,C<br>B,C |
| 4 | B,C<br>A,B,C |
| 5 | |

…

AUTOMATED INTERLEAVED CLUSTERING RECOMMENDATION FOR DATABASE ZONE MAPS

FIELD OF THE INVENTION

The present invention relates to accelerated filtration by database statements. Herein are interleaved sorting techniques for automatically generating an optimal mapping from table columns to value ranges in each column for multiple storage zones that contain database blocks.

BACKGROUND

A zone map is a data access structure that reduces the cost of data access for a query by pruning of irrelevant data blocks. A zone map is most effective when data in a database table is clustered in a way that is aligned with the query workload and data characteristics and zone maps are constructed for columns most relevant to the workload. It would be helpful to automatically analyze a workload and recommend zone maps to be constructed for best performance.

Unsorted rows of a database table may cause suboptimal data locality, a suboptimal zone map, and suboptimal query execution latency. The benefit of state of the art ways of increasing data locality may be limited due to data dependencies between columns of a table. In some cases, such data dependencies may be difficult to discover, and suboptimal data locality may be difficult to diagnose. When data locality is decreased, filtration intensive activities such as data mining, data science, reporting, auditing, and online analytic processing (OLAP) may experience excessive storage input/output (I/O) that wastes precious computer resources such as time and electricity due to excessive scanning.

BRIEF DESCRIPTION OF THE DRAWINGS

In the drawings:

FIG. 1 is a block diagram that depicts an example computer that accelerates filtration of columns in a table by database statements in a workload by interleaved sorting of rows in the table and automatically generating an optimal zone map that is a mapping from columns to value ranges in each column for many storage zones that contain rows;

DETAILED DESCRIPTION

Figure 2:
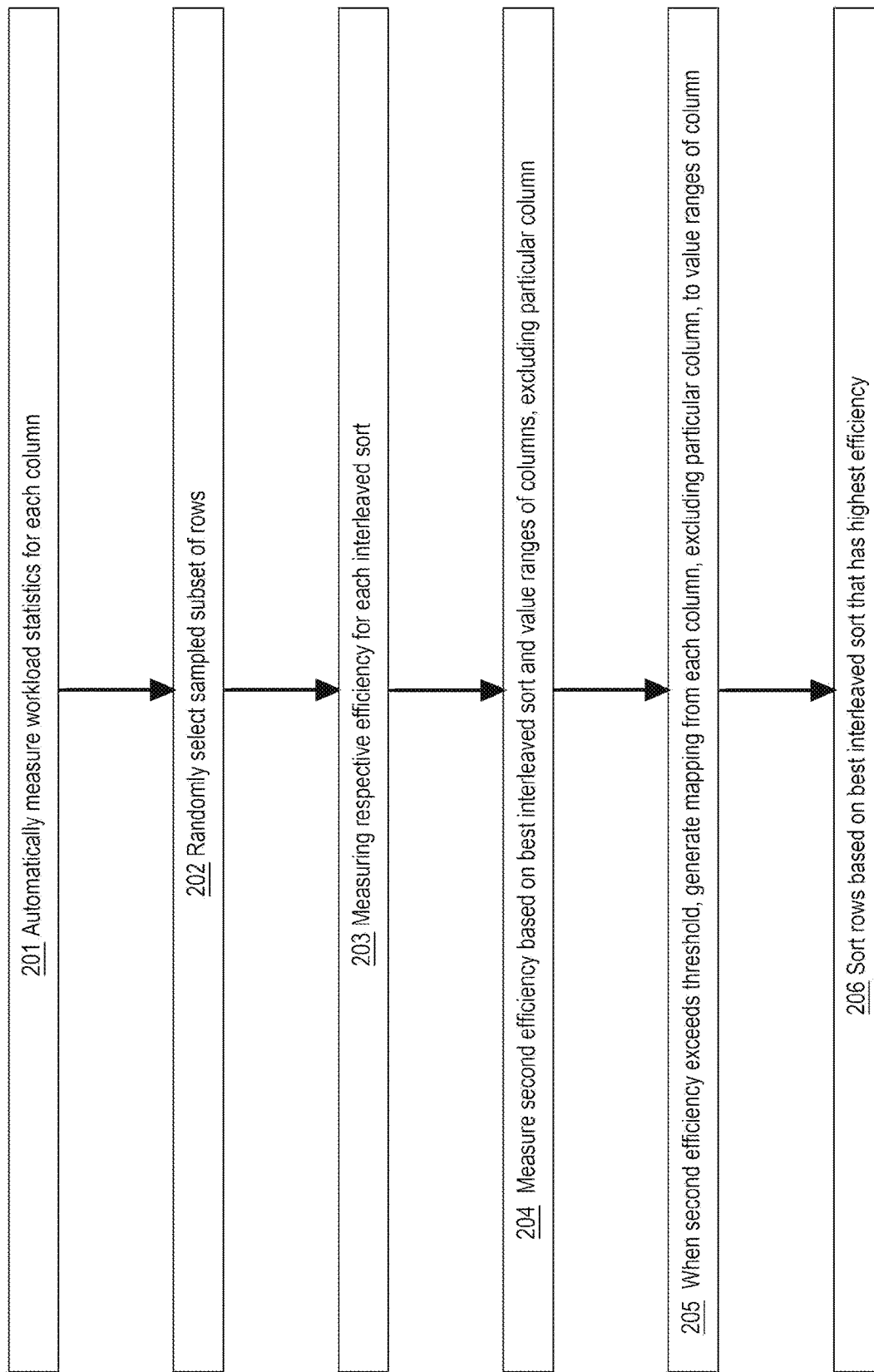
FIG. 2 is a flow diagram that depicts an example computer process that accelerates filtration of columns in a table by database statements in a workload by interleaved sorting of rows in the table and automatically generating an optimal zone map.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

For accelerated filtration by database statements, herein are interleaved sorting techniques that automatically generate an optimal mapping from table columns to value ranges in each column for multiple storage zones that contain database blocks. In the context of data warehouses and online analytic processing (OLAP) with dimension tables and fact tables, where zone maps may generally be used, the fact tables are the largest tables and fast data access is crucial. There often are a large number of filter predicates on columns in dimension tables that usually are joined with the fact table on a join column. Thus, the most effective use of zone maps may be to construct them on dimension table columns. For acceleration, a zone map may be constructed by first temporarily joining the fact table with the dimension table, and then storing the minimum and maximum values for the relevant dimension table columns in the zone map. Novel optimization of a zone map based on interleaved sorting may be summarized as follows.

For example to perform an interleaved sort on columns A,B of table T in an embodiment, a relational database management system (RDBMS) may create a temporary virtual column based on a bitwise interleaving of the values in columns A and B for each row, and table T is sorted on this temporary column. Herein, bitwise interleaving provides an ordering of multidimensional (e.g. more than two dimensions) data into a single dimension to increase data locality. Interleaved sorting creates an ordering where, for each unique combination of the interleaved columns, all occurrences are located adjacent to each other in a single location such as a contiguous sequence of storage blocks as discussed herein. This provides a high degree of locality that zone maps can benefit from. Additionally, for each individual column involved, interleaved sorting increases data locality, without the computational expense of precisely sorting each column individually.

As an example, a database table in a retail store containing customer orders is interleaved sorted on two columns, Month and Item Id. This sorting provides high efficiency if most queries are searching for information about certain Item Ids in certain months, because all rows with a particular (Item Id, Month) combination will be located adjacent to each other in a single location.

The RDBMS can use zone map information to avoid accessing irrelevant data blocks. For example, if the item is sold only in a few months (e.g. Christmas trees in December), such locations might be far fewer than twelve. As another example with an interleaved sort on columns Zip Code and State, because there is a many-to-one association from Zip Code to State, all rows with a particular Zip Code would still be located in one location. In other words, if data in two columns is correlated, interleaved sorting on those two columns is likely to increase efficiency.

For a database workload of multiple database statements, herein are ways to select which columns to interleave sort on and to select which columns to build zone maps on. The following may be important factors that affect whether interleaved sorting on a column may increase data locality.

- Column Importance: Only columns that feature in a significant portion of filter predicates should be considered because data access structures are not useful for columns that are queried too infrequently or never.
- Column Co-occurrence in Queries: If a majority of queries have 'AND' filters on a fixed subset of columns, then efficiency may be increased by performing an interleaved sort on these columns. For example as discussed above, if a majority of queries on a table search for items with a particular Item Id in a particular month, an interleaved clustering on these two columns would be highly efficient. However, because sorting a table is an expensive process in terms of computation and storage input/output (I/O), such query workload information can only be used if it is known in advance that the query workload will be highly predictable. For this reason, an efficiency estimation model herein does not try to identify co-occurring columns within queries, and is instead based on individual columns' importance alone.

Query Selectivity for Column: More efficiency is provided by interleaved sorting on columns for which queries are highly selective, because with sufficient data locality, only a small number of zones will be accessed. In comparison, if queries on a particular column usually select a majority of rows, an interleaved sort on the column or a zone map for the column might not be helpful.

In-list Size: If queries on a particular column are a union of a large number of equality predicates such as in the case of large structured query language (SQL) IN( . . . ) lists, or if the queries usually consist of a large number of OR conditions, then zone maps are seldom useful. This is because a large IN( ) list increases the likelihood that at least one of the elements in the list will be present in a given zone.

Column Statistics: A particular column with a low cardinality (i.e. small number of distinct values, NDV) is a good choice for interleaved sorting. This is because the sort splits the other interleaved column into fewer locations. For example if the Item Id column is interleaved with the Month column, then the same Item Id could be located at a maximum of twelve different locations, while interleaving Item Id with Zip Code could cause the same Item Id to potentially be located at thousands of locations (e.g. one corresponding to each Zip Code).

Relationships to Other Columns: Columns that are highly correlated to each other are good candidates for interleaved sorting because they divide each other into fewer locations. For example, Zip Code and State columns in a table can be interleaved with each other to ensure collocation (i.e. data locality). As another example, Zip Code and Item Id might be interleaved with each other if certain items are sold only in certain Zip Codes.

Due to the complicated nature of inter-column data dependencies, this approach does not try to explicitly model the data dependencies. Instead, candidate interleaved sorts are experimentally evaluated on a data sample, and respective sort efficiencies for the entire original dataset is extrapolated from respective sort efficiencies on the sample. The sample is much faster to repeatedly resort. However, running the entire workload on a sample could be slow as well, particularly when there are a large number of candidate sorts to search through. To address this, herein is a condensed model of the queries of a workload. By substituting the entire dataset with a sample and the workload queries with a streamlined workload model, alternative interleaved sorts can be compared in seconds instead of hours, which facilitates exploring in less time the efficiencies of more sorts. Due to that acceleration of the exploration itself, a computer may automatically estimate the acceleration provided to a workload by many distinct experimental sorts of a table, which facilitates either: a) finding a better sorting than the state of the art during a fixed time spent exploring or b) finding a best sorting in less time than the state of the art.

In an embodiment, a computer automatically measures for each column in many rows: a) a respective frequency of statements that filter the column in a workload of database statements, b) a respective count of distinct values used for filtration on the column in each statement individually, c) a respective frequency of each of the counts of distinct values used for filtration on the column across all of the database statements, and d) a respective value range of the column for each of many storage zones. Each storage zone contains a respective disjoint (i.e. nonoverlapping) subset of the rows. A sampled subset of the rows is randomly selected. Each column contains a respective value for each row in the sampled subset of the rows. A respective efficiency is measured for each of many distinct interleaved sorts. Each interleaved sort uses a respective distinct subset of the columns. Each interleaved sort is based on portions of each of the values for each row in the sampled subset of rows in each column of the subset of the columns of the interleaved sort. Efficiency measurement is based on frequencies of statements, value ranges of columns for each storage zone, and frequencies of counts of distinct values. The rows are then sorted based on a best interleaved sort that has a highest efficiency.

1.0 EXAMPLE COMPUTER

FIG. 1 is a block diagram that depicts an example computer 100, in an embodiment. Computer 100 accelerates filtration of columns A-D in table 110 by database statements S1-S2 in workload 120 by interleaved sorting of rows R1-R4 in table 110 and automatically generating optimal zone map 160 that is a mapping from columns A-C to value ranges in each column for storage zones X-Y that contain rows R1-R4. Computer 100 may be one or more of a rack server such as a blade, a personal computer, a mainframe, a virtual computer, or other computing device.

1.1 EXAMPLE QUERIES

Each of database statements S1-S2 may specify a respective create, read, update, or delete (CRUD) command. Database statements S1-S2 may be expressed in a data manipulation language (DML) such as structured query language (SQL). In an embodiment, each of database statements S1-S2 may specify a query by example (QBE).

Each of database statements S1-S2 may or may not specify filtration. For filtration, a database statements may reference one or more columns (including zero or more of columns A-D) in one or more tables that may or may not include table 110. In this example, database statement S1 is the following SQL query.

SELECT D FROM TABLE_110 WHERE A<>B AND A IN('Chicago', 'Denver', 'Boston')

The WHERE clause in database statement S1 specifies filtration of table 110 based only on columns A-B. Database statement S1 references column D, but not for filtration. Database statement S1 does not reference column C.

In this example, database statement S2 is the following SQL query that contains a sub query.

SELECT MAX(C) FROM TABLE_110 WHERE A<>'Richmond' AND B='NJ' OR C<(SELECT COUNT(*) FROM TABLE WHERE A IS NOT NULL AND C IS NOT NULL)

Database statement S2 contains two WHERE clauses. For purposes herein, both WHERE clauses may be concatenated and analyzed together as a single combined WHERE clause. The combined WHERE clause in database statement S2 specifies filtration of table 110 based only on columns A-C. Database statement S2 does not reference column D.

1.2 EXAMPLE WORKLOAD STATISTICS

In the shown embodiment, column D is excluded from further analysis and not shown in workload 120 because none of data statements S1-S2 filters column D. In workload 120, each of columns A-B is filtered by two statements, and column C is filtered by one statement. Those counts are unit normalized as respective weights for columns A-C. For example as shown for weight 130, column B has a weight of 1.0, which is the maximum possible weight and indicates that all of database statements S1-S2 filter column B.

The filtration cardinality of a column is a count of literal values that are specified for the column in a particular database statement. For example, column A has a filtration cardinality in database statement S1 of three because database statement S1 contains 'Chicago', 'Denver', and 'Boston' as literal values for filtering column A. Database statement S1 contains no (i.e. zero) literal values for filtering columns B-C. Respectively for each of statements S1-S2, filtration cardinalities for columns A-C are shown for count 140.

The <> inequality operator in statement S2 is a special case that is based on contents of column A. The filtration cardinality of column A for statement S2 is one less than the content cardinality of column A. For example if column A contains thirty distinct values, then the filtration cardinality of column A for statement S2 is 30−1=29.

Heterogeneity 150 is based solely on count 140. For heterogeneity 150, a respective probability density for each of columns A-C is generated by binning the filtration cardinalities for count 140 into a histogram for each column. In this example, each histogram has four bins that are numbered 0-3. For example per count 140, the filtration cardinalities for column B are zero and one for respective database statements S1-S2, and those cardinalities correspond to bins 0-1 that each shows a unit normalized probability of 0.5. A cardinality is calculated as a count, but the cardinality may be used as an identifier of a bin to increment by one. After filling the bins by incrementation, the respective tally in each bin is unit normalized. Thus for a given column (i.e. for a column's shown histogram), the unit normalized probabilities sum to one.

1.3 EXAMPLE ZONE MAP

All of measurements 130, 140, and 150 are made without actually accessing table 110. That is, workload 120 depends on the structure of table 110, but not the contents (e.g. row count) of table 110. In contrast, zone map 160 is based on which values in columns A-D occur in each of storage zones X-Y that each stores a respective horizontal slice of table 110 in row major format. In this example, zone X contains rows R1-R3, and zone Y contains row R4.

In an embodiment, each zone contains a respective disjoint (i.e. not overlapping another zone) contiguous sequence of storage blocks (e.g. disk blocks or database blocks or virtual memory pages) that contain the zone's horizontal slice of table 110. In an embodiment, a zone is contained in at most one disk track, which means that reading the whole zone entails at most one track seek, a first rotational latency to find the start of the zone, and a second rotational latency to reach the end of the zone.

Depending on the embodiment, each zone may or may not contain a same count of objects such as storage blocks, table rows, or values of columns. Depending on the embodiment, each storage block may or may not contain a same count of objects such as table rows or values of columns.

In an embodiment not shown, instead of zone map 160 that tracks multiple columns, each column has its own zone map that tracks only that column. In an embodiment, table 110 is horizontally partitioned, and each partition has its own zone map. For example, multiple partitions may be hosted by computer 100 or by separate respective computers. For example, computer 100 may generate an optimized zone map for data that another computer hosts.

Zone map 160 tracks the range (i.e. minimum and maximum) of values in each of zones X-Y for each of columns A-D. Mechanisms for determining a minimum and maximum depends on the datatype of the column. For example, column C's minimum and maximum are determined by numeric comparison of numbers.

Likewise, column A's minimum and maximum are determined by lexical comparison of text strings. For example as shown in zone map 160, values alphabetically range from 'Boston' to 'Denver' in zone X and from 'Paris' to 'Paris' in zone Y. In this example, an empty string is shown as '' . Depending on the embodiment, a null value may or may not be treated as an empty string or a zero.

In an embodiment, zone map 160 may be updated when rows are modified, added, removed, or sorted in table 110. For example, deleting either of rows R2-R3 (but not R1) in zone X may cause statistics for column A to be updated in zone map 160

Zone map 160 accelerates column filtration for table 110 when executing a database statement, even if the statement is not in workload 120. For example while executing database statement S1, zone map 160 may be used to detect that filtration of column A excludes all rows in zone Y. In that case, filtration by statement S1 is accelerated by not accessing (e.g. not scanning) zone Y.

1.4 EXAMPLE EFFICIENCY ESTIMATION

Zone map 160 should be repopulated when table 110 is sorted because sorting may cause a row to be moved from a first zone to a second zone, which may affect the content statistics of either or both zones. When zone map 160 is updated, the speed of filtration may be increased or decreased for some database statements because how many and which zones need accessing during filtration may change. Sorting does not affect the result of a statement, but may affect the speed of the statement.

How many and which columns are used for sorting may affect the content statistics of zones as tracked by zone map 160. Thus, different sorts may cause a same statement to execute at different respective speeds. Selection of sorting columns may increase or decrease the aggregate speed of a dynamic workload or a static workload such as workload 120. Speed of a dynamic (e.g. unpredictable or fluctuating) workload may be empirically measured by executing the workload on a given sort of table 110. Speed of static workload 120 on a given sort of table 110 instead is estimated (i.e. predicted) according to an estimation model that does not actually execute statements S1-S2. The estimation model uses the statistics in workload 120 and the statistics in zone map 160 together in a synergistic way to accurately reflect the data accesses of statements S1-S2. The estimation model is accelerated because it does not actually execute statements S1-S2 and minimally accesses the contents of table 110. Due to that acceleration, computer 100 may estimate the speed provided to workload 120 by many distinct experimental sorts of table 110 (or a subset of its rows as discussed later herein), which facilitates either: a) finding a better sort than the state of the art during a fixed time or b) finding a best sort in less time than the state of the art.

In an embodiment, the estimation model applies the following estimation formula to predict the speed provided by a particular sort. In particular, the estimation formula instead estimates the latency (e.g. total duration) of workload 120. Because latency is mathematically or informally the opposite of speed, converting latency into speed may be more or less straightforward. More precisely, the following estimation formula predicts latency as a count of zones that will be accessed.

$$\sum_{c \in Q} w_c \cdot \left[ \sum_{z_j \in Z} \left( 1 - \left( 1 - \frac{V^c(\min(z_c^j), \max(z_c^j))}{NDV_c} \right)^{\bar{d}_c} \right) \right]$$

The following terms have the following meanings in the estimation formula.

Q is workload 120.

c is a filtration column in workload 120 (i.e. not column D that is unfiltered in workload 120).

$w_c$ is weight 130 for the filtration column (e.g. 1.0 for column B).

Z is all storage zones X-Y in zone map 160.

$z_j$ is the j-th storage zone.

$NDV_c$ is the number of distinct values (NDV) actually stored in the filtration column in table 110 (or a subset of its rows as explained later herein).

$z_c^j$ is the value range of the filtration column in the j-th zone as recorded in zone map 160.

$V^c$ is the cardinality of $z_c^j$.

$\bar{d}_c$ is the average filtration cardinality of the filtration column.

Cardinality $V^c$ may be measured by counting how many distinct values in the filtration column in entire table 110 (i.e. all zones X-Y are inclusively in the value range of the j-th zone. For example if zone Y also contained a row R5 (not shown) that contained value 'FL' in column B, then distinct value 'FL' increases both $V^c$ for zone X (even though zone X does not contain value 'FL') and $NDV_c$ by one, where c is column B.

Average filtration cardinality $\bar{d}_c$ is a weighted average of the histogram bin numbers that are discussed earlier herein for heterogeneity 150, where the weight of the bin is a unit normal fraction shown in a bin of the histogram of the filtration column for heterogeneity 150. For example, when c is column A, the weighted average is 0.5×2+0.5×3=2.5, which is the average filtration cardinality of column A.

1.5 INTERLEAVED SORT

Different sorts for table 110 may be compared based on respective invocations of the estimation formula. For example, a best sort may be the one that provides the most speed (i.e. the least latency per the estimation formula). Herein, each sort is an interleaved sort, which is a special and atypical way to sort rows of a table. A conventional multicolumn sort prioritizes (i.e. sequences) the sorting of each sort column. For example a SQL sort clause such as "ORDER BY C, A" sorts using column C as a primary sort column and column A as a secondary sort column. In other words both sort columns A and C would not be treated equally with regards to importance and effect. For example instead, "ORDER BY A, C" specifies a different sort.

Herein, an interleaved sort treats all sort columns as equal. Unlike a conventional sort, the sort columns of an interleaved sort are not specified as a sequence, but instead as an unordered set. Herein, an interleaved sort is based on portions of values in sort columns, which is unlike a conventional multicolumn sort that is based solely on whole values in sort columns.

Depending on the embodiment and/or the datatype of a sort column, a portion of a value of a sort column may be one or more bits, one or more bytes/octets, or one or more characters (e.g. for a string column). The smaller are the portions, the more equal is the sorting effect of the columns, with one-bit portions providing the most equality. Herein, interleaving of portions of values of multiple sort columns is a way to generate a sort key for a row of a table being sorted. A respective interleaved sort key may be generated for each of rows R1-R4.

For example, an interleaved sort of table 110 may be based on columns B-C as sort columns, and an interleaved sort key for row R3 may be generated by decomposing shown value 'MA' into a sequence of three-bit portions and by decomposing shown value 10 into a sequence of three-bit portions. Those two sequences of portions may be combined into an interleaved concatenation of three-bit portions. The concatenation repeatedly alternates between a next one portion from column B and a next one portion from column C.

In an embodiment, each character in 'MA' is a byte having eight bits. In other words, 'MA' has 2×8=sixteen bits. In an embodiment, value 10 is a long integer formatted as a machine word that has 64 bits. In that case, 'MA' has six three-bit portions and value 10 has 22 three-bit portions. In that case, the first (i.e. most significant) six of the three-bit portions of each column are interleaved and the remaining sixteen portions of value 10 are concatenated to the sort key without interleaving.

In an embodiment, a null value and an empty string have no bits and no portions. In an embodiment, a null value has a predefined reserved sequence of bits that can be divided into portions. In an embodiment, an empty string has an integer count (i.e. zero) of bytes that is a length indicator that can be divided into portions.

1.6 EXAMPLE SORT OPTIMIZATION

In an embodiment, each experimental interleaved sort has its own sequential lifecycle that has two states that are unapplied and applied. Applied means that: a) the interleaved sort was used to sort table 110 (or a subset of its rows as explained later herein) and b) the estimation model (e.g. the estimation formula) predicted a latency (i.e. count of zones accessed). Unapplied means that the sort columns of the interleaved sort were selected, but the sort has not yet occurred. Herein, an unapplied sort may be synonymous with its set of sort columns.

Exploration to discover a best interleaved sort may be based on iterative use of queue 170 that buffers unapplied interleaved sorts that are generated by incrementally adding another sort column to the sort columns of an applied interleaved sort. Depending on the embodiment, access to the contents of queue 170 is: fist in first out (FIFO), random access, or both. Queue 170 may be implemented as an array or linked list.

Queue 170 is demonstrative. Pseudocode of a somewhat different exemplary embodiment is presented later herein. Discussion herein of queue 170 and its operation is not limiting on the exemplary embodiment presented later herein.

In an embodiment, operation of queue 170 may entail a sequence of iterations 0-5 in this example. In each iteration, the element at the head of queue 170 is dequeued and processed. Each element in queue 170 is a distinct set of sort columns for a distinct interleaved sort. Depending on the embodiment, an element in queue 170 may have as few as zero (per the shown embodiment) or one (in an embodiment presented later herein) sort columns. In the shown embodiment, queue 170 initially contains only an element that has an empty set of sort columns, as shown in iteration 0.

Each iteration starts by dequeuing the current element from the head of queue 170 which, in iteration 0, is an empty set of sort columns that represents table 110 (or a subset of its rows as explained later herein) being unsorted. If the current element is not an empty set, then the current iteration interleaved sorts table 110 using only the sort columns of the current element. Statistics in zone map 160 are recalculated to reflect the interleaved sort that occurred in the current iteration.

The estimation model predicts the count of zones accessed for the current interleaved sort based on components 110, 120, and 160 such as according to the estimation formula presented earlier herein. If the current count of zones accessed is less than a least count so far as seen in all previous iterations, then the current count replaces the least count, and the set of sort columns of the current interleaved sort is retained as a representation of the best interleaved sort so far.

The current iteration finishes by incrementally generating zero or more new unapplied interleaved sorts and appending them onto the tail of the queue. Incremental generation of new unapplied interleaved sorts from the current interleaved sort entails adding another respective sort column to each of the new sorts. The additional column is selected from the columns that are included in workload 120 (e.g. column D is excluded).

Generation of the following interleaved sorts are excluded. Sorts are distinct, and an (applied or unapplied) interleaved sort that was previously generated should not be redundantly generated. Each sort has a set of distinct sort columns, and a generated sort should not have multiple occurrences of a same sort column.

In iteration 0 where the current element is an empty set, three new unapplied interleaved sorts are generated that each have a single distinct sort column. At the start of each iteration, the contents of queue 170 for that iteration are shown as one element (i.e. set of sort columns) per line of text. Iteration 1 shows three lines of text that represent the three unapplied interleaved sorts that were generated and enqueued in iteration 0 and are the contents of queue 170 when iteration 1 starts.

An element is shown in bold in the iteration immediately after the element was enqueued. In subsequent iterations, the element is shown as not bold. For example, the interleaved sort having only columns A-B as sort columns is generated and enqueued immediately before iteration 2 and shown in iteration 2 as bold and shown in iterations 3-4 as not bold.

The head of queue 170 is shown as the top line of text in an iteration. For example, the interleaved sort having only column C is dequeued from the head of queue 170 in iteration 3.

Various embodiments may have one or more of the following example stopping criteria that cause iteration to cease when evaluated at the end of the current iteration or at other times as presented later herein: queue 170 is empty; the current count of zone accesses falls below a first threshold; all possible interleaved sorts having fewer sort columns than a second threshold were already applied; and convergence (i.e. improvement of the least zone accesses so far falls below a third threshold).

2.0 EXAMPLE INTERLEAVED SORT OPTIMIZATION PROCESS

FIG. 2 is a flow diagram that depicts an example process that computer 100 may perform to accelerate filtration of columns A-D in table 110 by database statements S1-S2 in workload 120 by interleaved sorting of rows and automatically generating optimal zone map 160 that is a mapping from columns A-C to value ranges in each column for storage zones X-Y that contain the rows, in an embodiment. FIG. 2 is discussed with reference to FIG. 1.

Steps 201-203 discover a best interleaved sort for table 110. Step 201 automatically measures workload statistics for each column. For example, step 201 populates the statistics of workload 120 as discussed earlier herein including weight 130, count 140, and heterogeneity 150 for columns A-C.

Table 110 may have tens of columns and billions of rows that may be intractable to repeatedly resort. For acceleration of exploration, step 202 randomly selects a sampled subset of rows of table 110. Instead of entire table 110, the random sample is used to discover a best interleaved sort. In an embodiment with further acceleration of the exploration, the random sample contains only filtration columns of workload 120 (i.e. excludes column D).

In an embodiment, at most 0.2 percent of the rows of table 110 are sampled. In an embodiment, at least twenty rows are sampled from each zone. In an embodiment discussed later herein, the random sample is stored in a separate database table. In an embodiment, the separate table contains key column(s) that can be used to cross-reference an original row from a sample row. For example, the key column(s) may store a (e.g. compound) primary key of table 110 or row identifiers (ROWIDs) of corresponding rows of table 110. In an embodiment, the separate table contains a column that indicates which zone of table 110 did a sampled row come from. In an embodiment, the zone is instead determined based on a logical block address (LBA) specified in the discussed ROWID.

Step 203 measures a respective efficiency for each experimental interleaved sort. In an embodiment, step 203 performs iterations 0-5 with queue 170 as discussed earlier herein. When applying an interleaved sort and measuring the efficiency provided by the sort, for acceleration step 203 uses the sampled subset of rows instead of entire table 110.

The result of step 203 is discovery of a best interleaved sort that has a highest efficiency as discussed earlier herein. The sampled subset of rows should be sorted based on the best interleaved sort before performing steps 204-205. Depending on the embodiment, steps 204-205 do or do not occur. The purpose of steps 204-205 is to decrease the size of zone map 160 by excluding column(s) for which zone map 160 does not empirically provide workload acceleration.

Step 204 remeasures the efficiency provided by the best interleaved sort by temporarily excluding any particular column from zone map 160. If ignoring the particular column's statistics in zone map 160 causes the efficiency to fall below a threshold, then the particular column is important and should remain in zone map 160. In an embodiment, step 204 applies the following impact formula to measure the loss in efficiency from temporarily excluding the particular column.

$$\frac{E[A_Q | \neg c] - E[A_Q]}{E[A_Q]}$$

The following terms have the following meanings in the impact formula.

E[$A_Q$] is the efficiency when using entire zone map 160, e.g. measured by the estimation formula presented earlier herein.

c is the temporarily excluded column.

E[$A_Q | \neg c$] is the (e.g. decreased) efficiency when ignoring the excluded column's statistics in zone map 160.

Step 205 detects whether or not the efficiency loss measured by step 204 exceeds a threshold. In an embodiment, the threshold is 0.05 (i.e. 5%). Step 205 causes step 206 to exclude the particular column(s) from the final zone map that step 206 generates as discussed below.

Step 206 sorts all of the rows of table 110 based on the best interleaved sort. In other words, interleaved sort key generation as discussed earlier herein is applied to each row of table 110.

The result of step 206 is that table 110 is optimally sorted for workloads that more or less resemble workload 120. Because interleaved sorting by step 206 uses only portions of columns, rows in any zone of table 110 and rows in all of table 110 are not actually sorted on any whole column. In other words, the result of optimal interleaved sorting may still appear unsorted for many purposes, including example purposes such as executing database statement S1 and/or S2. For example, sorting specified in a query should always occur when the query executes, even though table 110 already is optimally interleaved sorted by step 206.

After interleaved sorting by step 206, step 206 also should entirely regenerate zone map 160, which entails more than recalculating existing statistics in zone map 160. As discussed later herein, sorting table 110 by step 206 may sometimes cause introduction of new zones and removal of some or all old zones, which may require full reconstruction of zone map 160. For example depending on the embodiment, sorting of table 110 does or does not occur in place (e.g. by swapping rows to reorder them).

3.0 EXAMPLE ACTIVITIES FOR DISCOVERING A BEST INTERLEAVED SORT

Figure 3:
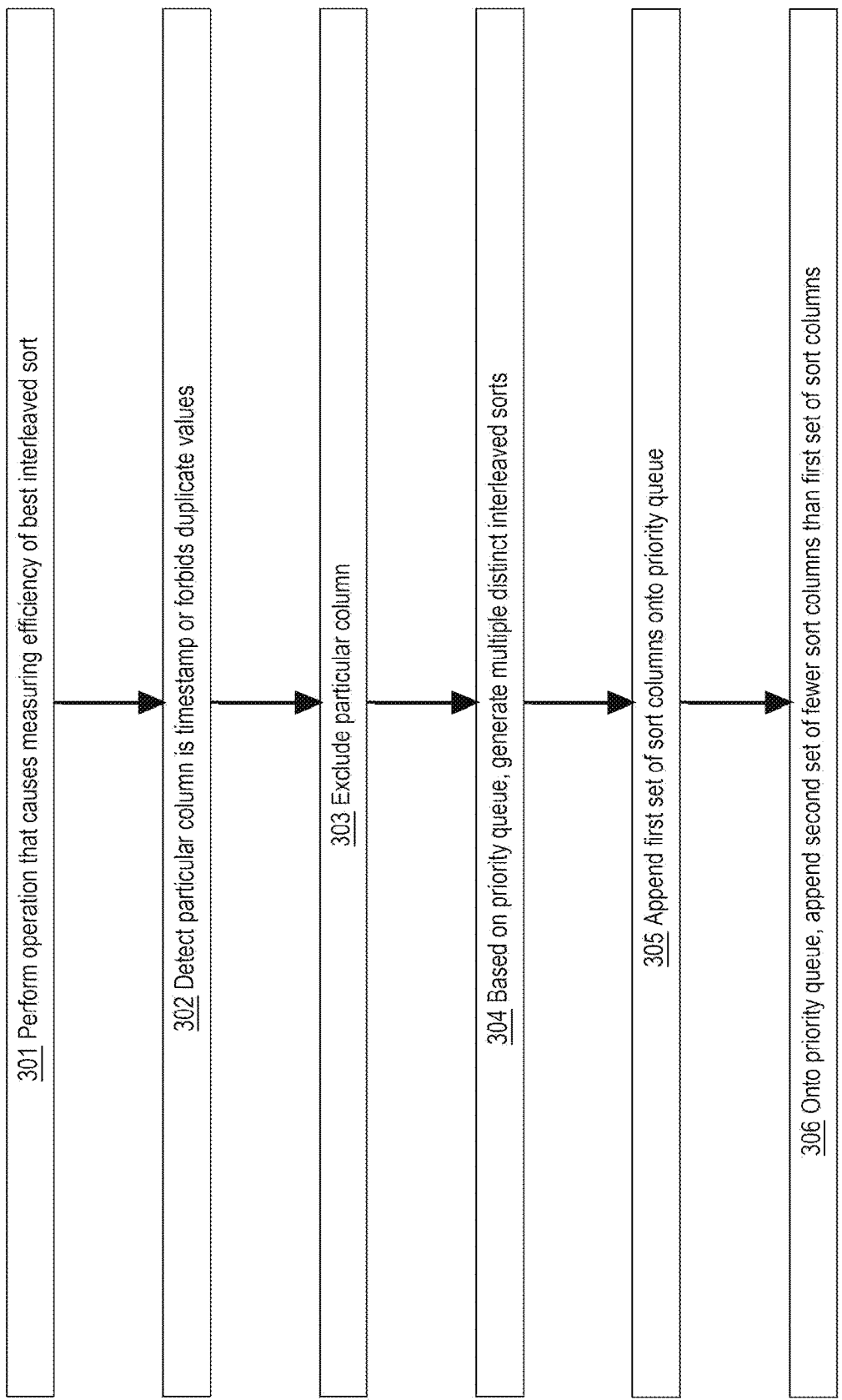
FIG. 3 is a flow diagram that depicts an example computer process that causes discovery of a best interleaved sort.

FIG. 3 is a flow diagram that depicts example activities that an embodiment of computer 100 may perform to cause discovery of a best interleaved sort. The steps of the processes of FIGS. 2-3 are complementary and may be combined or interleaved. FIG. 3 is discussed with reference to FIG. 1.

Step 301 performs an operation that causes discovery of the best interleaved sort and causes measuring the efficiency of best interleaved sort. In one example, the operation is execution of a command that is dedicated solely to interleaved sort optimization and zone (re-)mapping. In one example, the operation is execution of a command that expressly requests interleaved sort optimization and zone (re-)mapping as an optional additional activity. In one example, the operation is execution of a command that does not requests interleaved sort optimization and zone (re-) mapping, but computer 100 automatically decides to supplement the operation by also performing interleaved sort discovery and zone (re-)mapping. In one example and without a command from a database client, the operation is an autonomous decision to perform interleaved sort optimization and zone (re-)mapping.

For example, the operation may shrink table 110, which entails compaction such as moving some rows to fill gaps within database blocks that might previously have stored since deleted rows. As explained earlier herein for step 206 of FIG. 2, an operation that moves many rows may cause rows to change zones and may cause addition or removal of zones. Based on the operation being disruptive to the arrangement of already stored rows or based on the operation causing generation of many new rows, step 301 causes steps 302-306 and also causes: discovery of a new best interleaved sort; resorting of table 110 based on the new best sort, and regeneration of zone map 160.

In one example the operation is execution of a data manipulation language (DML) statement such as a SELECT INTO statement. In one example the operation is execution of a data definition language (DDL) statement such as a CREATE TABLE AS SELECT statement.

Step 302 detects that the datatype of a particular column is timestamp or that the particular column lacks (e.g. forbids) duplicate values. Automatic inspection of a database schema may reveal that the particular column is configured as UNIQUE or as an automatically generated sequence (e.g. of primary key values).

Those are examples of columns that might be unlikely to increase efficiency when used as one of the sort columns of an interleaved sort. In that case, step 303 may exclude the particular column from workload 120, even if database statements S1-S2 filter the particular column.

Based on a priority queue, step 304 generates multiple distinct experimental interleaved sorts. For example, queue 170 may be a priority queue that is iteratively operated more or less as discussed earlier herein. In one example, a new unapplied interleaved sort may be inserted at a position in the queue such that the new sort is inserted ahead of all already enqueued unapplied sorts that were incrementally generated from any applied sort whose efficiency was less than the efficiency of the applied sort from which the new sort was generated. For example, new sorts incrementally generated from a current best sort are inserted at the head of the queue.

Step 305 appends a first particular set of sort columns onto a priority queue that was not necessarily empty. Step 306 demonstrates an activity that would not occur if queue 170 were not a priority queue. Onto the end of the priority queue, step 306 appends a second particular set of fewer sort columns than the first particular set of sort columns has. In other words unlike queue 170 as shown in FIG. 1, the queue may contain a sequence of unapplied sorts that are not monotonically increasing in size.

4.0 EXEMPLARY EMBODIMENT

The following exemplary embodiment is based on embodiments presented earlier herein. Design choices demonstrated by this exemplary embodiment are not limitations on the embodiments presented earlier herein. The exemplary embodiment is discussed with reference to FIG. 1.

4.1 EXEMPLARY SAMPLING

Sample creation occurs in the exemplary embodiment as follows. After the candidate columns (e.g. columns A-C in workload 120) have been identified, a materialized sample of only those columns is created. This sample is then analyzed to calculate the best sorting, and also to identify the zone map columns. Given a set of candidate columns C={cl, . . . , ci . . . , cnC}, a Fact table F, a set of Dimension tables D, and a set of Fact-Dimension join conditions J, the following example SQL statement may create the sample.

CREATE TABLE clustering_sample AS SELECT rowid row_id, C FROM F SAMPLE($sampling_percentage),D WHERE J;

Join conditions J are reconfigured to use left outer joins, instead of equijoins that usually are the default for Fact-Dimension joins. The reason for that join reconfiguration is to not exclude a Fact table row from the sample just because it does not join with one Dimension table, if it joins with other tables. A row sample is created instead of a storage block sample for better clustering accuracy. ROWIDs are saved as part of the samples because clustering by ROWID facilitates analyzing the default behavior of the original Fact table, in the absence of any other clustering. Herein, clustering is synonymous with interleaved sorting.

4.2 EXEMPLARY INTERLEAVED SORT OPTIMIZATION ALGORITHM

Below algorithm 1 is pseudocode that finds a best clustering solution. The algorithm is greedy. At each iteration, it selects the clustering with the least estimated number of zone accesses, and expands this current solution further, by adding to the current solution a candidate column that is not part of the current solution. Herein in a database table such as a table that stores rows sampled from another table, a virtual column has computed contents that may be materialized or unmaterialized. Algorithm 1 invokes the following functions.

Interleave_and_Sort(S, new_cand_cols) first creates a temporary virtual column by interleaving the columns in the list new_cand_cols, and then interleaved sorts the sample on these columns. This function is provided by a relational database management system (RDBMS).

Expected_Num_Accesses(Clustered_Sample) takes as input a clustered sample, and returns the expected number of zones visited for the workload, using the estimation formula presented earlier herein.

In addition to its input parameter, the function Expected Num Accesses (Clustered Sample) also has the following information related to the workload available to it.

The weight $w_c$ is attached to each column, as discussed earlier herein for the estimation formula.

The mean $\overline{d}_c$ is the average number of distinct values (NDV) of filters on the column, as discussed earlier herein for the estimation formula.

By running algorithm 1, the best solution of columns to cluster on is discovered. Algorithm 1 accepts the following as input.

S: A sample with columns C={c1, . . . , NC}
τ: Maximum number of clustering columns allowed (default=4)
Δ: Minimum percentage improvement required for column inclusion (default=5%)

Algorithm 1 emits the following as output.
a 2-tuple soln, where soln._1 is the list of clustering columns and soln._2 is the clustering efficiency
the expected number of zones visited for a randomly chosen query, given this clustering.

Here is the pseudocode of algorithm 1.
1 Set candidate solution queue U←φ
2 Set baseline soln←Expected Num Accesses(S,rowid)
3 Add 2-tuple (φ,baseline soln) to U
4 do
5 Set cur soln←u ∈ U with smallest value of u. 2
6 Set cur quality←cur soln. 2
7 Set cur clus cols←cur soln. 1
8 Set new soln found←False
9 for c ∈ C-cur clus cols do
10 Set new cand cols←cur clus cols.append(c)
11 Set S clus←Interleave and Sort(S,new cand cols)
12 Set new clus quality←Expected Num Accesses(S clus)
13 Set impr←(cur quality-new clus quality)/(cur quality)
14 if impr>Δ then
15 Add (new cand cols,new clus quality) to U
16 Set new soln found←True
17 while len(cur soln.cols)<τ and new soln found Result:
18 Set soln←u ∈ U with smallest value of u. 2
19 return soln After running algorithm 1, the best solution of columns to cluster on is available, as well as the expected number of zone maps visited for a randomly chosen query, given this clustering.

5.0 DATABASE OVERVIEW

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

5.1 QUERY PROCESSING

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
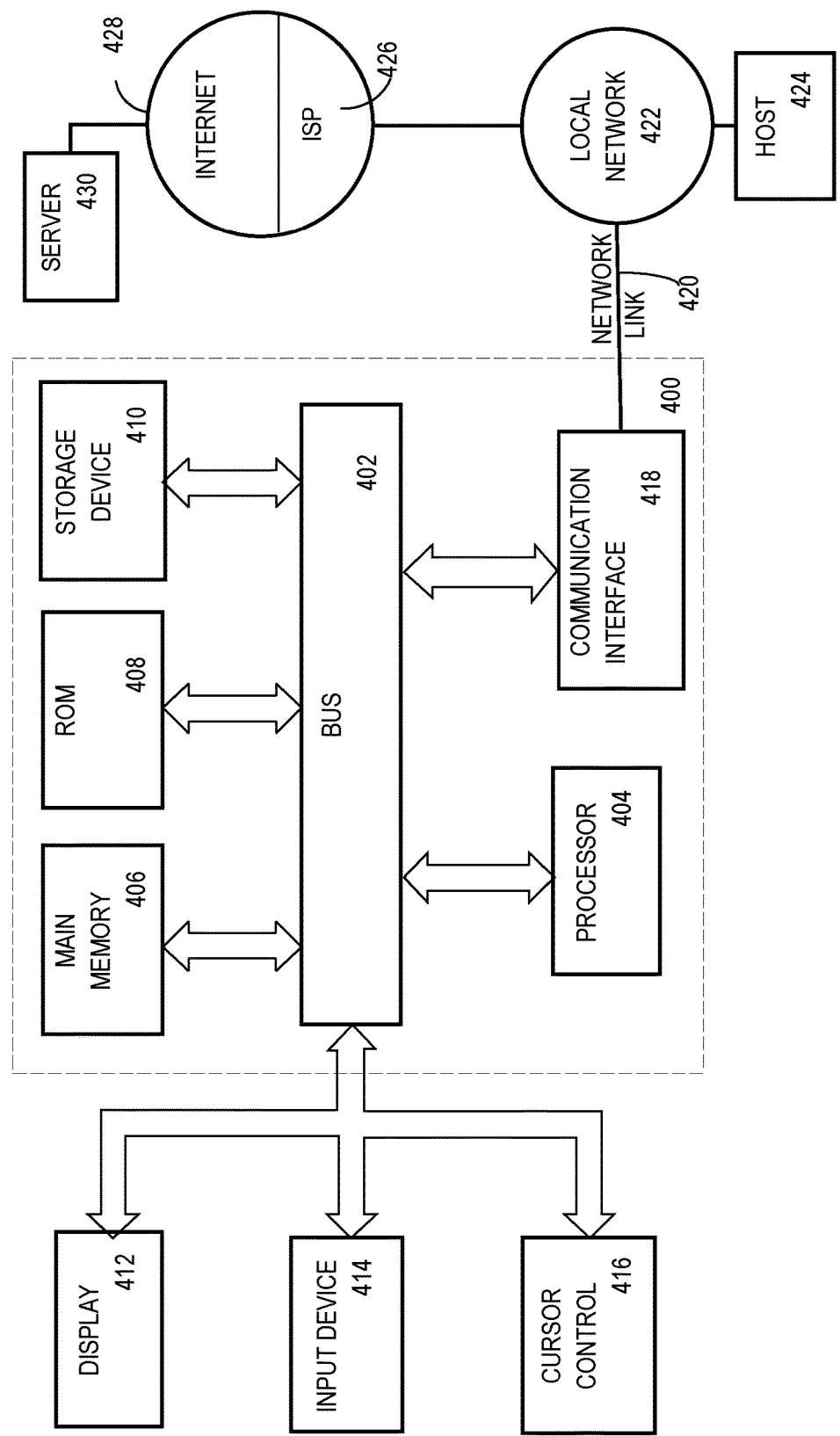
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electro-magnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

SOFTWARE OVERVIEW

Figure 5:
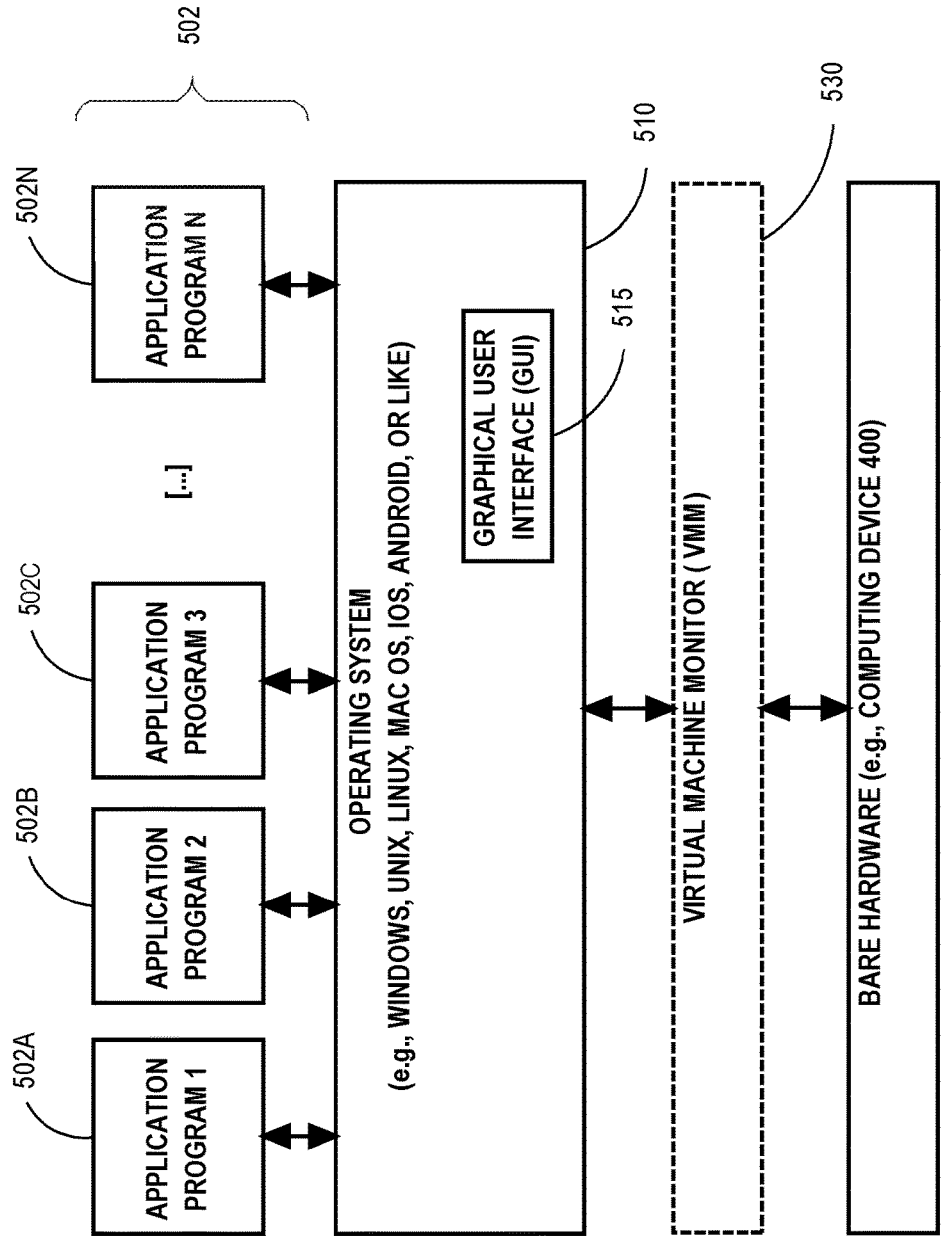
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

CLOUD COMPUTING

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   automatically measuring for each column of a plurality of columns in a plurality of rows:
      a respective frequency of statements that filter the column in a plurality of database statements,
      a respective count of distinct values used for filtration on the column in each statement in the plurality of database statements,
      a respective frequency of each respective count of distinct values used for filtration on the column in the plurality of database statements, and
      a respective value range of the column for each storage zone of a plurality of storage zones, wherein each storage zone in the plurality of storage zones contains a respective disjoint subset of the plurality of rows;
   randomly selecting a sampled subset of the plurality of rows;
   measuring a respective efficiency for each interleaved sort of a plurality of distinct interleaved sorts, wherein:
      each column of the plurality of columns contains a respective value for each row in the sampled subset of the plurality of rows,
      the interleaved sort has a respective distinct subset of the plurality of columns,
      the interleaved sort is based on a plurality of portions of each value of said values for each row in the sampled subset of the plurality of rows in each column of the respective disjoint subset of the plurality of columns of the interleaved sort, and
      the measuring the respective efficiency is based on: a) said respective frequencies of statements, b) said respective value ranges of the plurality of columns for each storage zone of a plurality of storage zones, and c) said respective frequencies of each respective count of distinct values;

measuring a new efficiency based on a best interleaved sort of a plurality of distinct interleaved sorts that has a highest efficiency and said respective value ranges of the plurality of columns, excluding a particular column of the plurality of columns;

generating, when the new efficiency exceeds a threshold, a mapping from each column of the plurality of columns, excluding the particular column, to said respective value ranges of the column; and sorting the plurality of rows based on said mapping that excludes the particular column.

2. The method of claim 1 further comprising generating, for each partition of a plurality of horizontal partitions of the plurality of rows, a respective mapping from a particular column of the plurality of columns to said respective value range of the particular column for each storage zone of a plurality of storage zones in the partition.

3. The method of claim 1 wherein the best interleaved sort is based on a null value in values that consists of no portions in said portions of each value of said values.

4. The method of claim 1 wherein the best interleaved sort is based on a particular portion in said plurality of portions of each value of said values that consists of one selected from the group consisting of: a plurality of bits, a byte, and a text character.

5. The method of claim 1 further comprising generating the plurality of distinct interleaved sorts based on a priority queue that contains multiple distinct subsets of the plurality of columns, wherein the priority queue prioritizes based on efficiencies of applied interleaved sorts.

6. The method of claim 1 further comprising:
generating the plurality of distinct interleaved sorts based on a queue that contains unapplied interleaved sorts;
appending onto the queue at least one selected from the group consisting of an empty subset of the plurality of columns and a first subset of the plurality of columns that contains fewer columns than a second subset of the plurality of columns that was appended onto the queue before the first subset of the plurality of columns.

7. The method of claim 1 further comprising performing an operation selected from the group consisting of shrinking a table that contains said plurality of rows, executing a SELECT INTO statement, and executing an AS SELECT statement, wherein said performing said operation causes said measuring the respective efficiency of the best interleaved sort.

8. The method of claim 1 further comprising:
detecting a particular column has a configuration selected from the group consisting of a timestamp and no duplicate values;
excluding, based on said detecting, the particular column from the plurality of columns.

9. The method of claim 1 wherein each storage zone of the plurality of storage zones consists of a respective disjoint contiguous sequence of storage blocks.

10. The method of claim 1 wherein:
the plurality of storage zones comprises a first zone and a second zone;
the first zone contains a different count of objects than the second zone;
the objects are selected from the group consisting of bytes, rows, and values.

11. One or more non-transitory computer-readable media storing instructions that, when executed by one or more processors, cause:
automatically measuring for each column of a plurality of columns in a plurality of rows:
a respective frequency of statements that filter the column in a plurality of database statements,
a respective count of distinct values used for filtration on the column in each statement in the plurality of database statements,
a respective frequency of each respective count of distinct values used for filtration on the column in the plurality of database statements, and
a respective value range of the column for each storage zone of a plurality of storage zones, wherein each storage zone in the plurality of storage zones contains a respective disjoint subset of the plurality of rows;
randomly selecting a sampled subset of the plurality of rows;
measuring a respective efficiency for each interleaved sort of a plurality of distinct interleaved sorts, wherein:
each column of the plurality of columns contains a respective value for each row in the sampled subset of the plurality of rows,
the interleaved sort has a respective distinct subset of the plurality of columns,
the interleaved sort is based on a plurality of portions of each value of said values for each row in the sampled subset of the plurality of rows in each column of the respective disjoint subset of the plurality of columns of the interleaved sort, and
the measuring the respective efficiency is based on: a) said respective frequencies of statements, b) said respective value ranges of the plurality of columns for each storage zone of a plurality of storage zones, and c) said respective frequencies of each respective count of distinct values;
measuring a new efficiency based on a best interleaved sort of a plurality of distinct interleaved sorts that has a highest efficiency and said respective value ranges of the plurality of columns, excluding a particular column of the plurality of columns;
generating, when the new efficiency exceeds a threshold, a mapping from each column of the plurality of columns, excluding the particular column, to said respective value ranges of the column; and
sorting the plurality of rows based on said mapping that excludes the particular column.

12. The one or more non-transitory computer-readable media of claim 11 wherein the instructions further cause generating, for each partition of a plurality of horizontal partitions of the plurality of rows, a respective mapping from a particular column of the plurality of columns to said respective value range of the particular column for each storage zone of a plurality of storage zones in the partition.

13. The one or more non-transitory computer-readable media of claim 11 wherein the best interleaved sort is based on a null value in values that consists of no portions in said portions of each value of said values.

14. The one or more non-transitory computer-readable media of claim 11 wherein the best interleaved sort is based on a particular portion in said plurality of portions of each value of said values that consists of one selected from the group consisting of: a plurality of bits, a byte, and a text character.

15. The one or more non-transitory computer-readable media of claim 11 wherein the instructions further cause generating the plurality of distinct interleaved sorts based on a priority queue that contains multiple distinct subsets of the plurality of columns, wherein the priority queue prioritizes based on efficiencies of applied interleaved sorts.

16. The one or more non-transitory computer-readable media of claim 11 wherein the instructions further cause:
   generating the plurality of distinct interleaved sorts based on a queue that contains unapplied interleaved sorts;
   appending onto the queue at least one selected from the group consisting of an empty subset of the plurality of columns and a first subset of the plurality of columns that contains fewer columns than a second subset of the plurality of columns that was appended onto the queue before the first subset of the plurality of columns.

17. The one or more non-transitory computer-readable media of claim 11 wherein the instructions further cause performing an operation selected from the group consisting of shrinking a table that contains said plurality of rows, executing a SELECT INTO statement, and executing an AS SELECT statement, wherein said performing said operation causes said measuring the respective efficiency of the best interleaved sort.

18. The one or more non-transitory computer-readable media of claim 11 wherein the instructions further cause:
   detecting a particular column has a configuration selected from the group consisting of a timestamp and no duplicate values;
   excluding, based on said detecting, the particular column from the plurality of columns.

* * * * *